(12) United States Patent
Jarrett et al.

(10) Patent No.: US 7,434,173 B2
(45) Date of Patent: Oct. 7, 2008

(54) SCROLLING WEB PAGES USING DIRECT INTERACTION

(75) Inventors: Robert J. Jarrett, Snohomish, WA (US); Richard J. Duncan, Kirkland, WA (US); Emily K. Rimas-Ribikauskas, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 548 days.

(21) Appl. No.: 10/928,747

(22) Filed: Aug. 30, 2004

(65) Prior Publication Data

US 2006/0048071 A1    Mar. 2, 2006

(51) Int. Cl.
*G06F 3/048* (2006.01)
(52) U.S. Cl. ........................ 715/784; 715/785
(58) Field of Classification Search ................. 715/784, 715/785, 786, 787; 345/179, 684, 173
See application file for complete search history.

(56) References Cited

U.S. PATENT DOCUMENTS

| | | | |
|---|---|---|---|
| 5,634,064 A | 5/1997 | Warnock et al. | |
| 5,864,330 A * | 1/1999 | Haynes | 715/856 |
| 6,097,387 A | 8/2000 | Sciammarella et al. | |
| 6,259,432 B1 * | 7/2001 | Yamada et al. | 345/159 |
| 2002/0051018 A1 * | 5/2002 | Yeh | 345/784 |

* cited by examiner

*Primary Examiner*—Tadesse Hailu
*Assistant Examiner*—Nicholas S Ulrich
(74) *Attorney, Agent, or Firm*—Birch, Stewart, Kolasch & Birch, LLP

(57) ABSTRACT

Aspects of the present invention provide a system and method for scrolling or dragging information on a display. A panning tool is provided that may scroll information, such as a web page, on a display in tandem with movement of a cursor. If interactive elements are present on the page or document, an interactive element may be activated as desired. Scrolling may be accomplished with the panning tool either on non-interactive elements or interactive elements that are not required to be activated. Furthermore, inertia of movement of the information on a display is optimized and autoscrolling is provided in which a page or document may be scrolled without dragging.

26 Claims, 6 Drawing Sheets

Page 300

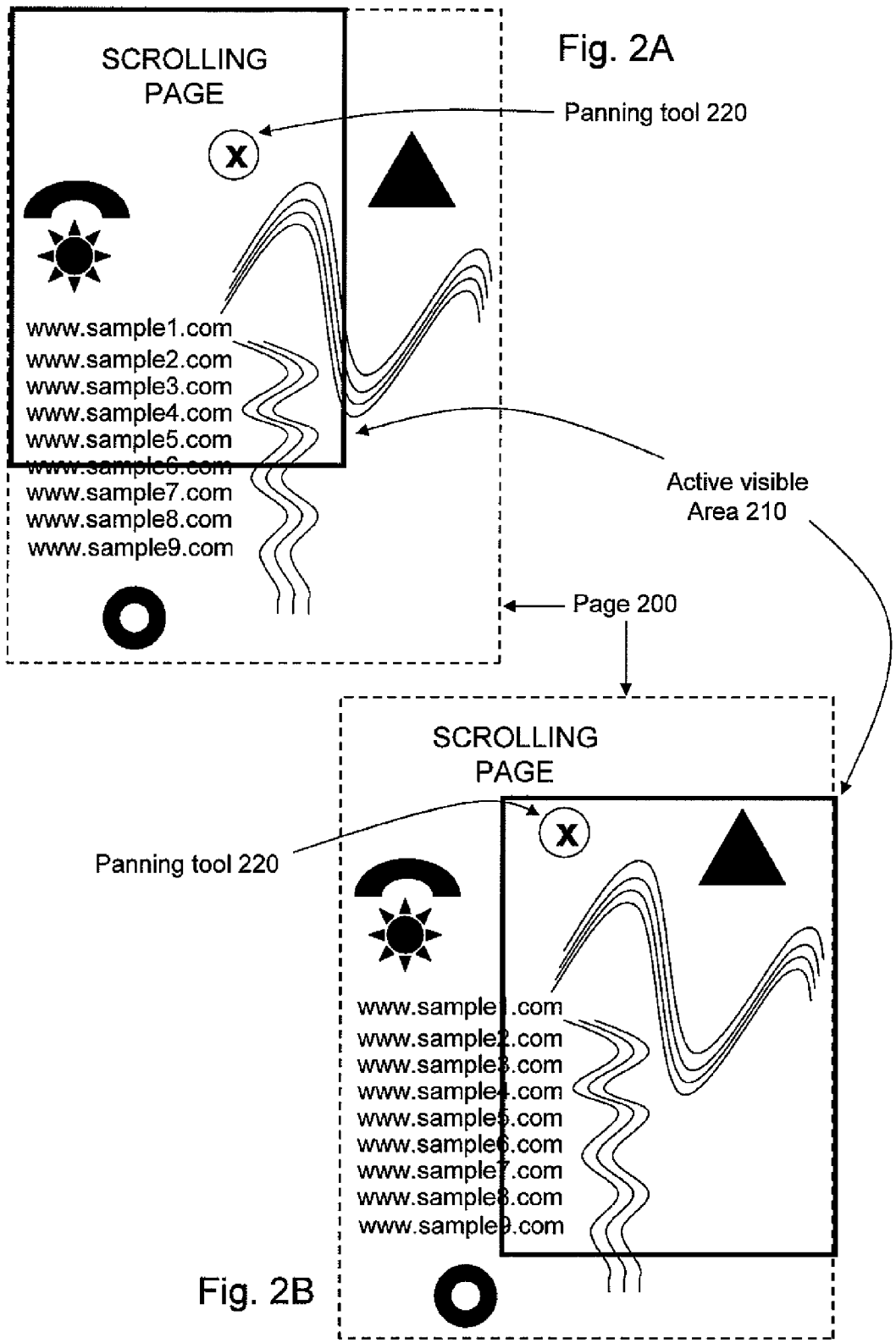

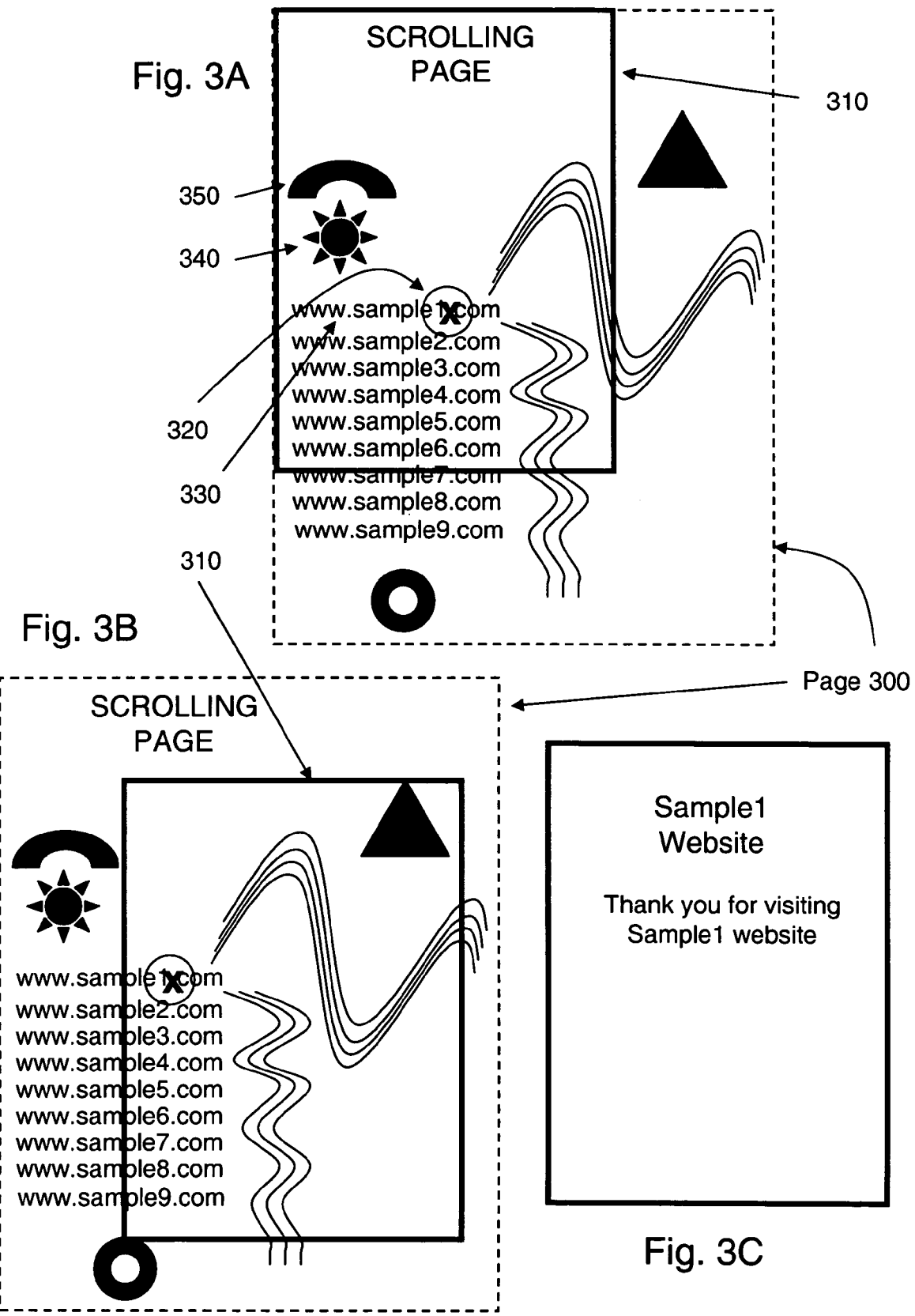

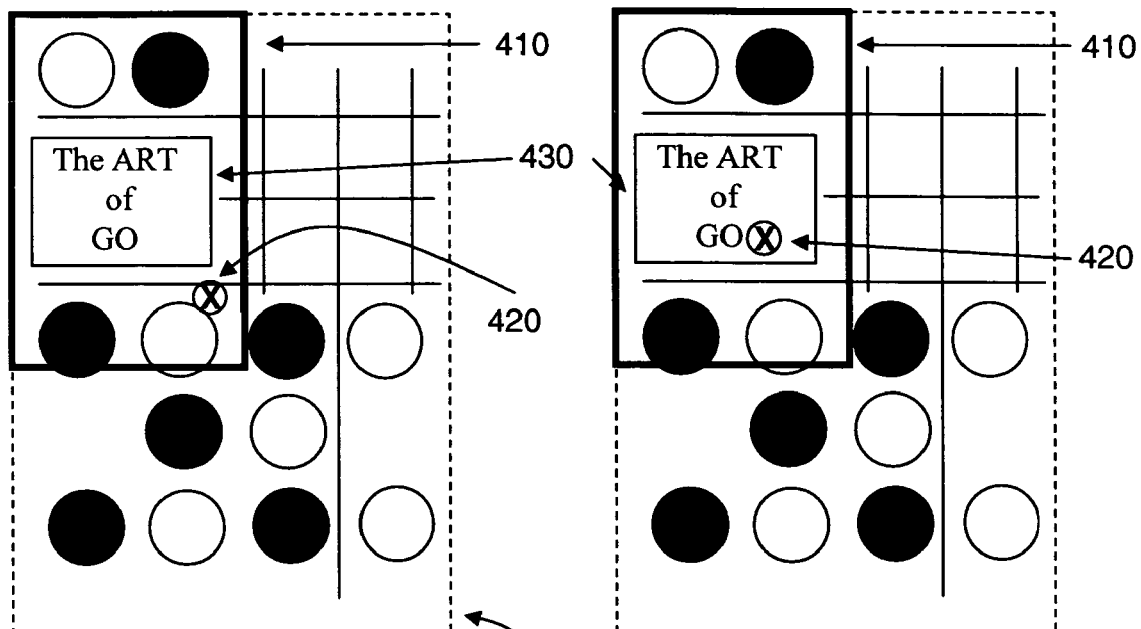
Fig. 4A
Fig. 4C
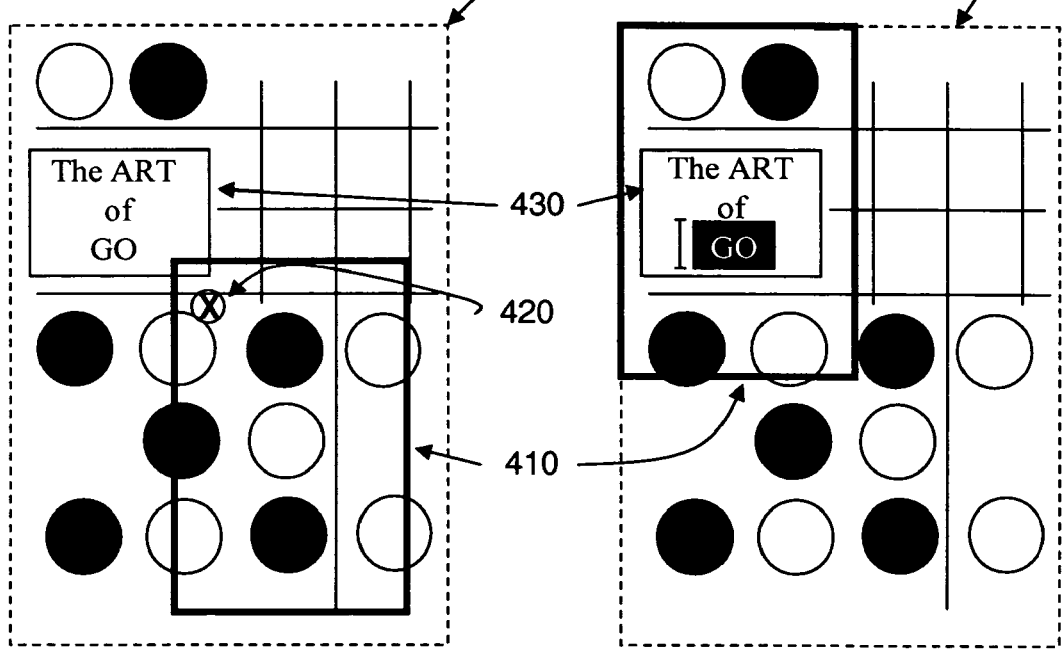
Fig. 4B
Fig. 4D

SCROLLING WEB PAGES USING DIRECT INTERACTION

FIELD OF THE INVENTION

Aspects of the present invention relates to scrolling pages and, in particular, directly interacting with interactive elements of a page while scrolling.

BACKGROUND OF THE INVENTION

Scrolling pages on a computer has been problematic for many years. The traditional method of scrolling on a computer has been through the use of scroll bars. Using this method, a user must position the cursor on the scroll bar, typically located on the side or the bottom of the computer screen, and click on a designated area of the scroll bar. Doing so moves the image on the screen in the direction indicated based on location of clicking on the scroll bar. Alternatively, the user may position the cursor on directional arrow buttons associated with the scroll bar to move the screen image in smaller increments.

However, a scroll bar is designed to be narrow so as to not take up excessive space on a computer screen. Thus, a user must exercise great care and manual dexterity to position the cursor on the narrow scroll bar. Due to such constraints in the size and location of the scroll bar as well as the limitations of the ergonomics of the hardware itself, the user may often fail to precisely move the cursor to the right point on the scroll bar thereby clicking in an improper location. This might lead to either scrolling in an improper and undesired direction or no scrolling at all. The problem of achieving the proper positioning of the cursor on the scroll bar is greatly worsened if the user is using a system in which movement of the cursor is less precise. Examples of such a system include laptop computers or Tablet PCs.

For example, on a Tablet PC, hand positioning is often sub-optimal. A user must exercise skill in accurately positioning the cursor at the proper position on the scroll bar. If the proper position is not achieved, the result is not what is expected, leading to great frustration of the user. For example, it is often difficult for a user to manipulate a stylus pen on a Tablet PC or to utilize a touch tablet such that the stylus pen or user's touch contacts the precise point on a contact surface (e.g., tablet) corresponding to positioning a cursor on the desired point on a scroll bar. If the user inadvertently fails to touch the contact surface (e.g., with the hand, stylus pen, etc.) in an area corresponding to the correct point on the scroll bar, an unexpected and undesired outcome results (e.g., scrolling in the wrong direction or not scrolling at all).

Attempts to simplify scrolling include the use of tools for panning. These panning tools, such as the "hand tool" in Adobe Acrobat Reader®, provide an alternative method of scrolling pages on a computer screen. Using the hand tool, a user may click onto the active area of the computer screen and drag the page in the desired direction as if "grabbing" the page and physically moving the page. This approach provides scrolling or panning capability on non-interactive PDF files but has great limitation in scrolling interactive pages, e.g., web pages.

When attempting to scroll pages with interactive content, for example, the hand tool would likely be effective in scrolling the pages only if the interactive elements are not directly encountered. However, if the user desired to interact with the interactive elements or content on the page, the hand tool would be unable to do so. For example, if while scrolling or panning a web page the user desired to activate a hyperlink on the web page, the user would have to first change the hand tool to a selection tool before being able to activate the hyperlink. Likewise, if the user wished to interact through activation of Javascript/DHTML, the user would have to first change the hand tool to a selection tool. This might necessitate selecting a different tool in the tool box followed by returning the newly selected tool/cursor to the location of the desired interactive content. Pausing scrolling to re-select a new tool is inconvenient to the user.

In some prior art methods, the hand tool is made to automatically convert to a selection tool when the cursor hovers over a hyperlink. Although such a solution may enable a user to avoid having to manually change tools from the hand tool to a selection tool in order to activate a hyperlink, for example, users would be frustrated if the hand tool happens to fortuitously hover over the hyperlink but the user still desires to scroll. In such a scenario, the hyperlink would be unexpectedly activated even though the user did not intend to launch the hyperlink. This would result in frustration for the user because the user would have to spend extra time and effort to return to the prior document to resume scrolling.

Scrolling a page on a computer is also problematic if the page is very large. For example, a web page might be very long such that a user would have to expend large amounts of effort in order to reach a desired point on the web site. Using prior art scrolling methods such as the "hand tool" in Adobe Acrobat Reader®, the user would have to either repeatedly click and drag with the hand tool of the prior art over and over again or face the problems of positioning the cursor on the scroll bar and navigating to the desired location on the web site. Either way, the user would only be able to reach the desired location on the web site after a great expenditure of large amounts of time and energy.

Also, scrolling using the traditional prior art hand tool or scroll bar often results in an unpleasant scrolling experience for the user because of the unevenness of scrolling. Specifically, the scrolling action may be rough and stilted. Such sudden starts and stops of scrolling resulting from the sudden cessation of scrolling when the input device, such as the mouse or the stylus pen, is deactivated by either releasing of the mouse button or lifting of the pen can cause great discomfort and uneasiness in the user.

Thus, a need exists in the art for a system and method for achieving effective scrolling or panning of an electronic document or page such that interactive elements within the document or page may be seamlessly activated while scrolling if desired without the problems associated with having to deselect the panning function. A need also exists in the art for optimizing scrolling or panning of pages on a computer over long distances and for making the scrolling action more natural to the user in terms of inertia of motion of the page.

SUMMARY OF THE INVENTION

Aspects of the present invention permit the scrolling or panning of information on a display, thereby overcoming at least one of the issues described above. The information, an example of which includes a web page, may contain an interactive element such as, but not limited to, hyperlinks, scripts, applets, or the like. The scrolling may be in tandem with moving a cursor on the display such that the information appears to be dragged across the display if the cursor or panning tool overlies a non-interactive element. Aspects of the present invention further include scrolling for a short interval after user interaction. These and other aspects of the invention are described herein.

BRIEF DESCRIPTION OF THE DRAWINGS

FIGS. 2A and 2B illustrate an example of aspects of the present invention in which a page is scrolled with the panning tool.

FIGS. 3A, 3B, and 3C illustrate another example of the panning tool of the present invention in which a page is scrolled and an interactive element is activated.

FIGS. 4A, 4B, 4C, and 4D illustrate another example of the panning tool in which a page is scrolled and text in a textbox is selected in accordance with aspects of the present invention.

DETAILED DESCRIPTION

Figure 1:
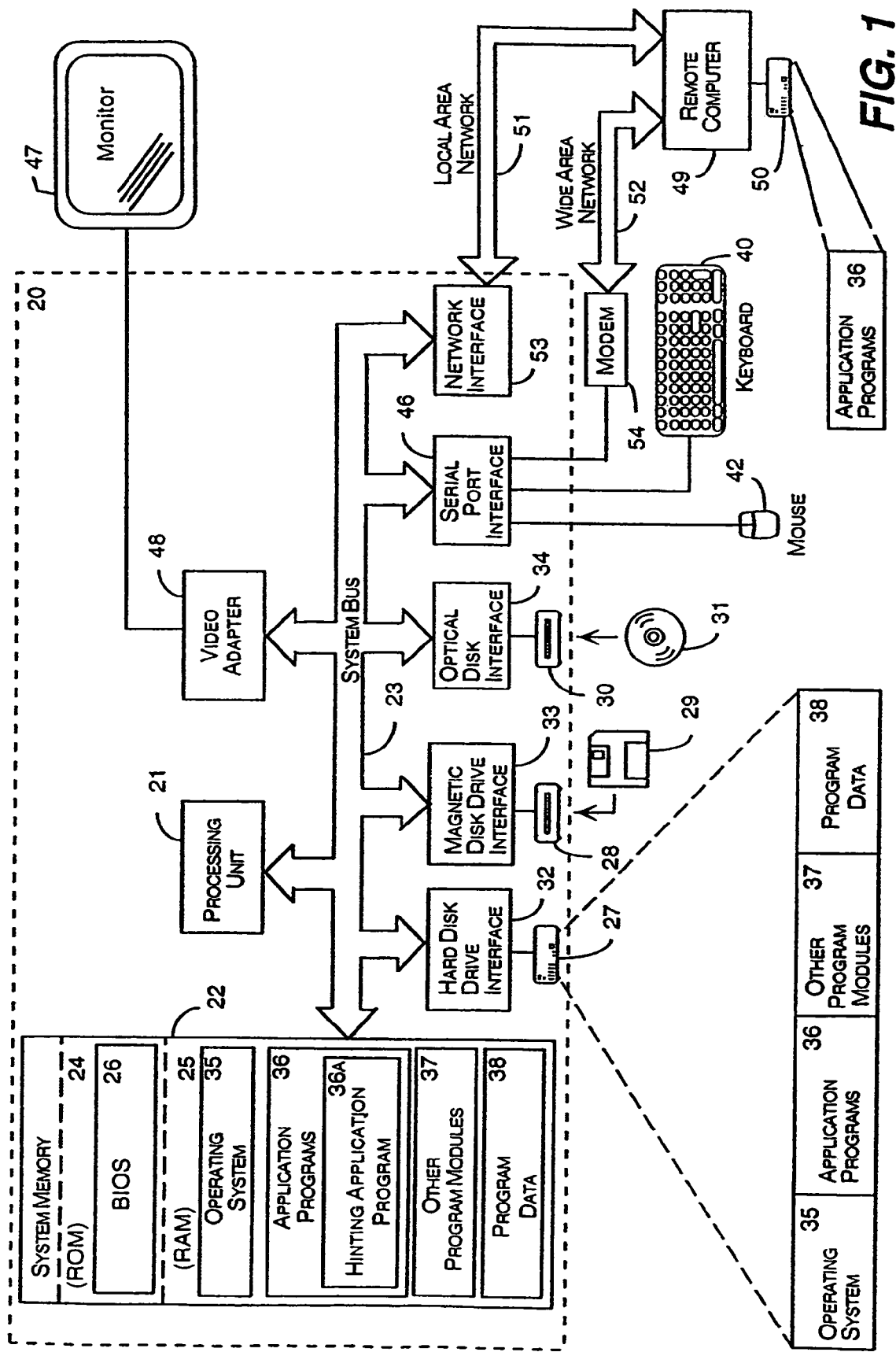
FIG. 1 illustrates an example of a suitable operating environment in which the invention may be implemented.

Aspects of the present invention provide a panning tool for scrolling a page on a computer. The panning tool of aspects of the present invention may be incorporated into a web browser application but is not so limited as the panning tool is directly applicable to all forms of scrolling of any type of electronic images, documents, objects or pages, for example.

In some aspects, when the cursor or panning tool overlies an interactive element, the interactive element may be activated without scrolling or dragging the information (e.g., web page) on the display. However, when the cursor or panning tool overlies an interactive element for which activation is not desired, the cursor or panning tool may scroll or drag the information on the display without activating the interactive element. Thus, some aspects of the present invention provide a system and method for scrolling or dragging information, such as an electronic document or web page, while maintaining the capability of activating interactive elements on the document or page as desired.

Aspects of the present invention further provide a system and method of enhanced scrolling or dragging of a page. A panning tool as provided may be used to effect the panning tool behavior of scrolling or dragging information on a display. The panning tool behavior may be activated in many ways. For example, the panning tool behavior may be activated through the activation of an input device. The input device, such as a mouse, stylus pen or finger, may be activated, for example, by pressing a button, touching the stylus to the screen, etc. However, any means of activation of an input device or panning tool behavior may be employed. Likewise, deactivation of the panning tool behavior may be accomplished in many ways. For example, deactivation of the panning tool behavior may be accomplished by deactivating an input device which depends on the input device used. For example, if a stylus pen is used, then deactivation of the input device may include lifting the pen. Likewise, if a mouse is used, deactivation of the input device may include releasing a mouse button.

In further aspects of the present invention, upon activation of the panning tool behavior, information on a display, such as a web page may be scrolled or dragged in tandem with the movement of the panning tool or a cursor. However, when the input device is deactivated, the information being scrolled continues to scroll over a predetermined period of time. The information being scrolled may decelerate over the predetermined period of time and stop at the end of the predetermined time period. The predetermined period of time may be constant or may vary. If variable, the predetermined period of time may be determined based on any factor pertaining to the movement of the cursor or document/web page. For example, the predetermined period of time may be calculated based on the length of the information or web page, pen pressure associated with the panning tool or cursor, velocity of the movement of the cursor or document/web page prior to release of the input device, acceleration of the cursor or document/web page, distance of movement of the cursor or document/web page, etc. For example, if the cursor and document/web page movement is fast prior to deactivation of the input device, then the predetermined period of time might be longer. In one embodiment, the predetermined period of time is set to 500 ms.

In another embodiment of the present invention, information on a display, such as a web page, may be scrolled automatically without "dragging". For example, the panning tool may be dragged into an area on the display that may cause the information on the display to scroll automatically in a designated direction. The direction and speed of the automatic scrolling may be indicated by the placement of the panning tool or cursor. For example, the panning tool or cursor may be placed in a particular orientation and/or distance in relation to the scrolling area which may in turn determine either the direction or the speed in which the information is scrolled automatically.

At least one advantage of some aspects of the present invention is that information on a display, such as a web page may be scrolled with the panning tool even if interactive elements are present and even if the panning tool overlies the interactive elements. However, at the same time, the interactive elements may be activated as desired even while the panning tool exhibits panning behavior over the page. Also, the movement of the information on the display may exhibit inertia in some implementations when the panning behavior is deactivated, thus providing a more natural feel for the user. Furthermore, even lengthy information on the display may be more easily and conveniently scrolled automatically.

FIG. 1 illustrates an example of a suitable operating environment 100 in which aspects of the present invention may be implemented. The operating environment 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 1, an illustrative system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media includes both volatile and nonvolatile media, removable and non-removable media. By way of example, and not limitation, computer readable media may comprise computer storage media and communication media and includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The panning tool of aspects of the present invention may be implemented as a selection in a tool box, a selection in a menu, as a pop up window/selection or any of a number ways of accessing a tool. For example, if used in a web browser application such as Internet Explorer, the panning tool may be a button on a toolbar or menu selection item that can be selected.

Further, the panning tool behavior (i.e., panning mode) may be toggled on or off. In this example, a user wishing to scroll or pan information on a display may locate the panning tool button on the toolbar, for example, and click on the button. Clicking on the button activates the panning tool behavior. Alternatively, the user may select the panning tool from a menu. Once the panning tool is selected, the panning tool may be used in panning mode to scroll the document.

When the panning tool behavior is activated, the user may scroll the page as disclosed but if the panning tool functionality is no longer desired, the user may deactivate the panning tool behavior in any number of ways. The user may, for example, select another tool from the toolbar or the menu. Alternatively, if the panning tool may be toggled, the user may also re-select the panning tool button to toggle the panning tool behavior off. The panning tool behavior may then be reactivated by selecting the panning tool button. Also hot keys may be used to activate or deactivate the panning tool behavior where certain predetermined key strokes may activate or deactivate the panning tool behavior as desired.

When panning tool behavior is activated, the panning tool enables scrolling of electronic documents, pages, graphics or any other such type of information, documents or images. The panning tool allows a user to drag a page using an input device such as a mouse or stylus pen rather than relying solely on a scroll bar or keyboard. The cursor is positioned on the page and the input device is activated, e.g., by the depression of a button on the input device. While the input device remains activated, the panning tool or cursor is dragged across the screen in the desired direction. The image or page on the screen moves in tandem with the movement of the cursor giving the appearance of the page being "dragged".

When a page is dragged, there may be imperfections in the dragging process on the part of the user. A user may wish to drag a page vertically, for example, but may be unable to direct the input device or the cursor in a precisely vertical fashion. Likewise, if a horizontal scroll is desired, the user may be unable to effect a strictly horizontal scroll due to variations in the drag direction. For example, a user may wish to scroll a web page in a downward (vertical) direction. However, if the user drags the page downward and slightly to the side, the page might scroll in a downward direction but the scrolling direction would be skewed to the side in which the user moved the panning tool.

In one aspect of the present invention, dragging with the panning tool permits the direction of either a horizontal or a vertical scroll to be biased in the proper direction even when the tool is not moved in a strictly horizontal or vertical direction. For example, if the skew of the movement of the scroll is within a certain tolerance level, which might be measured, for example, in the number of pixels, then the movement of the page would remain biased in the desired direction. If the user exceeds the predetermined threshold (e.g, exceeds the predetermined number of pixels off-center), the page will move in the direction of the drag. The predetermined threshold may be set to any number desired. In one embodiment, the predetermined threshold is 20 pixels. Also, additional directions may also utilize this feature. For example, scrolling may also be biased in a similar manner in 45 degree directions or any direction desired.

However, when the user desires to interact with the page in a manner other than dragging with the panning tool behavior active, the panning tool can react accordingly by temporarily suspending dragging operations as desired by the user. For example, the page may contain an interactive element in which the user may activate to accomplish a particular task. An interactive element is any element which provides for interaction with a user which might, when activated, perform a function. Examples of interactive elements include, but are not limited to, hyperlinks, Javascript/DHTML, ActiveX, and JAVA applets. A hyperlink, for example, is an interactive element because when it is activated, a function is performed (i.e., linking to an alternate web site). Likewise, applets or scripts are also interactive elements because when activated, such interactive elements perform tasks/functions specific to the corresponding applet or script. There are many such interactive elements known to those of skill in the art. Aspects of the present invention is not limited to any particular interactive element as any interactive element may be activated using the panning tool of aspects of the present invention.

In aspects of the present invention, with the panning tool behavior active, a user desiring the activation of an interactive element need not select an alternate tool or menu item for selection or activation of the interactive element or content on the page. Thus, this panning tool functionality is particularly useful when scrolling web pages that contain interactive elements. In one example, the user may be scrolling through a web page when the user observes an interactive element on the page, for example, a hyperlink to another page of interest. The user might decide to go to the other page of interest. Using the panning tool of aspects of the present invention, the user would be able to simply select the hyperlink without first deactivating the panning tool. The hyperlink would be activated and the user would be taken to the site pointed to by the hyperlink despite the fact that the panning tool was activated. However, if the user desired to continue scrolling and clicked on a hyperlink, the page would still scroll if the user dragged the panning tool in the desired direction. Similarly, any other interactive element on a page may be activated while scrolling if desired.

FIGS. 2A and 2B illustrate an example of aspects of the present invention in which a page is scrolled with the panning tool. In FIG. 2A, the page 200 is denoted by the dotted rectangle while the active visible area 210 of the page is denoted by the solid rectangle. Thus, in this example, the active visible area 210 is smaller than the page 200 so that only a portion of the page 200 may be viewed at any one time. The page 200 may be scrolled with the panning tool 220 which is depicted in FIG. 2A by an "X". A user positions the panning tool 220 at a point in the active visible area 210 of the page and activates an input device (not shown), such as a mouse, pen, etc. FIG. 2B shows the active visible area 210 in relation to the page 200 after the page 200 (or active visible area 210) is dragged. In this example, the page 200 of FIG. 2A is dragged toward the upper left corner of the active visible area 210 such that the page 220 appears to be dragged toward the left. As FIG. 2B shows, the new active area 210 (after dragging) contains elements previously not seen in the original active visible area 210 (of FIG. 2A) (e.g., the triangle).

FIGS. 3A, 3B, and 3C illustrate another example of the panning tool of aspects of the present invention. As in the example illustrated in FIGS. 2A and 2B, the active visible area 310 in the present example is smaller than the page 300 such that only a portion of the page 300 is seen at any one time. In FIG. 3A, the page 300 is depicted as a dotted rectangle and the active visible area 310 is depicted as a solid rectangle. The initial active visible area 310 (FIG. 3A) contains the title "Scrolling Page" and the sun 340 and crescent 350 icons, for example. The panning tool 320 is placed at a point in the active visible area 310 of the page (denoted by an "X" in FIGS. 3A and 3B). However, in this example, the panning tool 320 is placed over an active element 330 of the page 300 (in this case, a hyperlink). When the input device (not shown) is activated (e.g., a button is pressed on a mouse or pen) and the page 300 is dragged, the page 300 pans in the direction desired in tandem with the panning tool or cursor. FIG. 3B illustrates the active visible area 310 in relation to the page 300. As FIG. 3B shows, the page has been successfully dragged in the desired direction. Thus, despite the fact that the panning tool 320 was activated over a hyperlink, the hyperlink was not activated and the page was dragged as desired.

FIG. 3C in conjunction with FIG. 3A illustrates another example of the present invention. In this example, the user wishes to activate a hyperlink on a page. This might even occur following scrolling or panning a page. For example, the user may be scrolling/panning a page when a hyperlink is seen. In this example, the user may desire to go to the web site pointed to by the hyperlink "www.sample1.com", for example. The user positions the panning tool over the hyperlink and activates the input device. FIG. 3C illustrates the website pointed to by the hyperlink that was selected on the first page illustrated in FIG. 3A. Thus, the user has navigated to the hyperlinked web site even while using the panning tool—i.e., the user does not need to deactivate the panning tool 320 or change to an alternate tool to activate the hyperlink in this example.

There are many other possible active elements that may be on a page. The panning tool is able to exhibit behavior desired by the user based on selection and panning actions taken by the user. FIGS. 4A, 4B, 4C, and 4D illustrate another example of the panning tool. In this example, the active visible area 410 is smaller than the page 400 such that only a portion of the page 400 is visible at any given time. The panning tool 420 is denoted as an "X". In FIG. 4A, the active visible area 410 of the page 400 contains a text box 430 in which a user may insert text. The cursor is placed at a point in the active visible area 410, the input device is activated and the page is dragged (toward the upper left corner of the window in this example). FIG. 4B illustrates the active visible area 410 after the page 400 is dragged. The page thus displayed contains the page contents at the lower right corner of the page.

FIG. 4C illustrates another example of the panning tool in which the panning tool 420 is placed over the text box 430 and the input device activated, the text box 430 being "interactive" in that text may be added into the text box 430 or deleted from the text box 430 by the user. When the panning tool 420 is dragged over the page 400, the text "GO" is selected as illustrated in FIG. 4D. Alternatively, the cursor or panning tool 420 may be placed in the text box 430 without selecting text by activating the panning tool in the text box (not shown). In this example as illustrated in FIG. 4D, page 400 does not scroll or pan which is the desired result. Thus, the panning tool 420 can interact with content on a page or scroll the page as desired by the user.

Thus, the panning tool 420 may change functionality over certain interactive elements on a page. As seen in the last example, if the panning tool 420 is over a text box 430, the user may wish that the function of the panning tool be changed to the element default, i.e., text selection rather than panning. Hence, the functionality from activating the button on a stylus pen or mouse may change based on the underlying element.

Alternatively, the function of the panning tool 420 may be overridden by activating a button on the input device. For example, the panning tool 420 may be set to always pan (or never pan) by activating a particular function. This function may be activated by, for example, pressing a button on an input device or by selecting an option on a tool bar or menu.

Similarly, other interactive elements on a page 400 may be activated when desired by the panning tool. A page with or without interactive elements may also be scrolled as desired with the panning tool. Additional examples include but are not limited to Flash content, ActiveX, or scripts or any other interactive element that may be incorporated onto a page.

The panning tool functionality may be selectively performed as needed to either interact with the contents of a page (i.e., perform the behavior of the element selected) or scroll the page. As the cursor moves over a page, the underlying elements on the page at any point in time is evaluated and the proper behavior of the panning tool is implemented.

In another example of the panning tool behavior, the element is a scroll bar. When the panning tool hovers over a scroll bar, the panning tool performs the function of the scroll bar when the input device is activated. In this example, the panning tool hovers over the scroll bar, the input device is activated and the page scrolls as a result of the action of the scroll bar. However, if the panning tool hovers over a scroll bar when the input device is activated and the panning is tool is then dragged over the page, the result would be panning of the page in which the page is scrolled in tandem with the movement of the cursor or panning tool. Thus, by examining the interaction behavior, it is decided whether panning should occur or whether interaction with the underlying element should occur.

In general, the panning function of the panning tool is usually the default behavior. However, there are exceptions in which the panning tool functionality is overridden. Table 1 illustrates examples of possible responses and exceptions of the panning tool to underlying elements to both clicking (input device activation) and dragging of the panning tool over the elements. The behaviors listed in Table 1 are intended as non-limiting examples.

TABLE 1

| Element the Cursor Targets | Behavior for Hover | Behavior for Click | Behavior for Drag |
|---|---|---|---|
| Scrollbar | Element default | Element default | Element default |
| Editing handle | Element default | Element default | Element default |
| HTML tag A | Element default | Element default | Panning tool |
| HTML tag BUTTON | Element default | Element default | Panning tool |
| HTML tag AREA | Element default | Element default | Panning tool |
| HTML tag INPUT, type attribute equals file, password, or text | Element default | Element default | Element default |
| HTML tag INPUT, type attribute equals anything else (e.g., button, checkbox, radio) | Element default | Element default | Panning tool |
| HTML tag SELECT | Element default | Element default | Element default |
| HTML tag TEXTAREA | Element default | Element default | Element default |
| HTML tag APPLET | Element default | Element default | Element default |
| HTML tag EMBED | Element default | Element default | Element default |
| HTML tag OBJECT | Element default | Element default | Element default |
| Element has | Element default | Element default | Element default |

TABLE 1-continued

| Element the Cursor Targets | Behavior for Hover | Behavior for Click | Behavior for Drag |
|---|---|---|---|
| ONDRAGSTART Javascript handler Element has ONMOUSEDOWN Javascript handler | Element default | Element default | Element default |
| Element has ONCLICK Javascript handler | Element default | Element default | Panning tool |
| Element style has cursor: attribute set to hand | Element default | Element default | Panning tool |

Moreover, any HTML tag in the hierarchy may be analyzed. By examining any tag in the hierarchy (including nested tags) and not only the top-most element in the HTML tag hierarchy, the proper behavior may be more accurately discerned.

In addition, while scrolling or panning a page with the panning tool, it is desirable to have smooth transitions of the movement of the page when the panning tool is disengaged. For example, when scrolling or panning a page with the panning tool, the input device may be deactivated (e.g., the mouse button may be released or the stylus pen may be lifted off the surface). When this happens, the page typically stops abruptly giving the user an awkward feeling of unnatural page movement.

At least one aspect of the panning tool according to aspects of the present invention is able to retain the appearance of inertia of the movement of the page such that there is a seamless and natural transition for when the panning tool is disengaged. For example, when a stylus pen on a Tablet PC is dragged across a page, the page appears to be dragged along with the panning tool in tandem. As the stylus pen is dragged in a particular direction, the stylus pen may be lifted from the surface across which it is dragged. The page being scrolled may continue to scroll even after the stylus pen is removed from the surface. The continued scrolling of the page may continue for a predetermined period of time so as to give the user an appearance of natural panning of the page from the momentum or inertia of the original "push" provided by dragging with the stylus pen.

To maximize the natural feel of the panning tool when the panning tool is lifted from the dragging surface, the movement of the page after the panning tool is disengaged may depend on the drag itself. For example, it might depend on the force of the pen movement such as the speed, duration, acceleration and distance. Alternatively, it may be independent of the force of the pen movement. If the panning tool is moved such that the movement does not attain a certain threshold speed or distance, then the page might not continue movement after the panning tool behavior is disengaged. Alternatively, the deceleration and eventual stopping of the page scrolling may be achieved in a certain predetermined period of time regardless of the force, speed, distance or acceleration of the movement of the panning tool when the input device is engaged. This provides scrolling behavior based on the "inertia" of dragging the panning tool.

For example, a user may be trained to provide a certain threshold speed, distance and/or acceleration of the cursor or panning tool to achieve scrolling following deactivation or disengagement of the panning tool. When the user surpasses the threshold and then releases the button (or lifts the pen) or otherwise disengages the panning tool behavior, the page may continue scrolling for a certain length of time. If the length of time is predetermined and is constant, then the friction coefficient of the scrolling of page following disengagement of the panning tool may appear high with faster dragging. For example, if the time in which a page stops scrolling is 500 ms (in the range of 200 ms to 1000 ms) following disengagement of the input device, then a page that is scrolling faster initially would decelerate at a more rapid rate in order to stop moving entirely by the designated amount of time giving the appearance of a higher friction coefficient. Conversely, if the initial speed of the scrolling is slow, then the page would decelerate at a lower rate since the time in which to stop scrolling is constant giving the appearance of a "slippery" page.

By fixing the amount of time in which the page terminates scrolling after disengagement of the input device (e.g., lifting of the stylus pen), excessive scrolling can be avoided. For example, if a page is being scrolled at high speed, acceleration and/or over a long distance when the input device is disengaged and if there were no limitations on the length of time in which the page would stop, the page may scroll too far after cessation of scrolling is desired such that the point of interest on the page may be overshot.

Alternatively, the length of time in which to stop scrolling after disengagement of the input device (e.g., mouse or stylus pen) may be variable based on the characteristics of the initial movement of the panning tool or page. For example, if the contact time, speed/velocity of the scrolling, acceleration of the scrolling and/or distance scrolled is high, the page will decelerate over a longer period of time. It is preferable to limit the maximum length of time in which the page will decelerate to avoid overshooting the desired point on a page or the unnatural feel of excessive scrolling. For example, the length of time for deceleration might be limited to 100 ms to 1000 ms, but more preferably 400 ms to 800 ms. In one embodiment, the length of time for deceleration is set to 500 ms.

Also, if the page is in an inertial state (i.e., is scrolling after the input device has been disengaged), then the user may wish to prematurely halt the scrolling of the page rather than waiting for the page to decelerate to a stop on its own. Such a situation may occur, for example, when a desired point on the page appears to be reached in the scrolling but the scrolling continues past the desired point. If the user wishes to halt the scrolling of the page, the input device may be activated in the active visible area of the page (e.g., the pen is place down or the mouse button is clicked) to stop movement of the page.

In another example, the scrolling distance after release of the panning tool behavior may depend on the length of the document itself. For example, the scrolling distance may be based on a percentage of the length of the document such that a particular percentage of the document may be scrolled after disengagement based on the strength, velocity, acceleration, or distance of the initial scroll. In this example, the scrolling distance is relative as opposed to absolute such that rather than scrolling the same distance with the same velocity of the flick of the input device, a percentage of the document length may be scrolled based on the strength of the flick. In this way, it is possible to more effectively manage the scrolling of large documents.

Figure 5D:
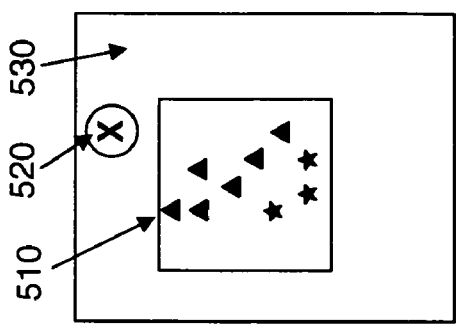
FIGS. 5A-5E illustrate an example of scrolling with the panning tool in the autoscroll area in accordance with aspects of the present invention.
Figure 5C:
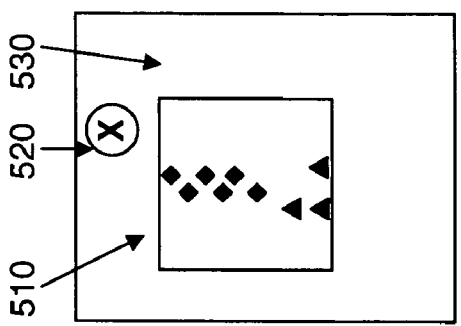
Figure 5B:
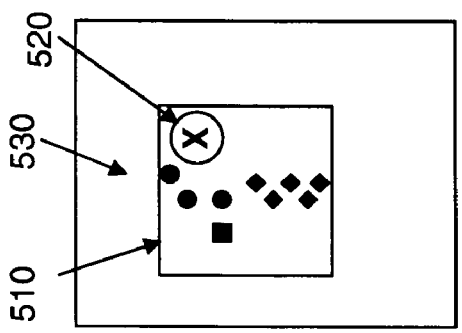

In another example of the panning tool, an "autoscroll" area may be provided such that when the panning tool enters the autoscroll area, scrolling or panning of the page proceeds automatically. For example, if the panning tool is dragged out of the active window area, the page in the window area may continue to scroll in the direction it was previously being scrolled or in the direction corresponding to the location of the panning tool relative to the active window area. FIG. 5 illustrates an example of scrolling with the panning tool in the autoscroll area 530. FIG. 5E illustrates a hypothetical page 500 with various geometric shapes. FIGS. 5A-5D correspond to active windows in which the page 500 of FIG. 5E is being scrolled. The portions of the page 500 illustrated in each of FIG. 5A-5D correspond to the corresponding sections of the page 530 illustrated in FIG. 5E.

Figure 5A:
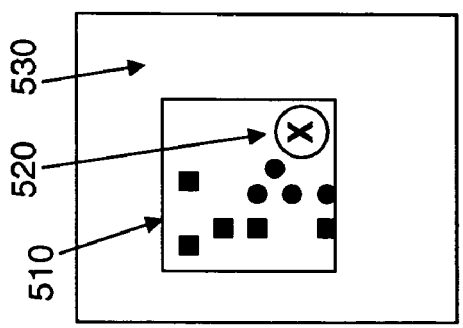
Figure 5E:
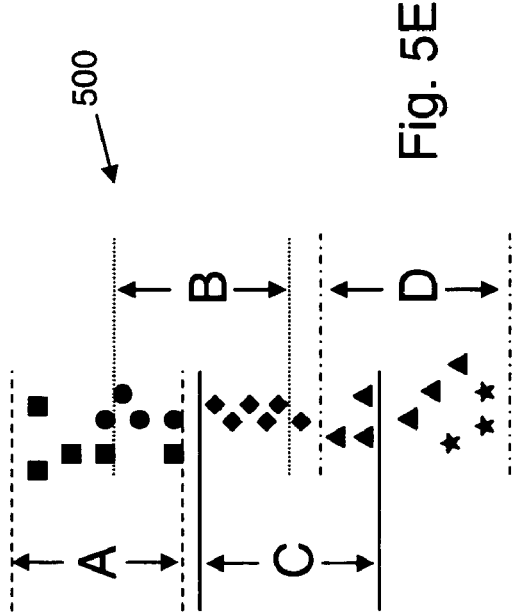

In FIG. 5A, the panning tool 520 is positioned in the active window area 510. The page 500 is dragged by the panning tool 520 upward to result in the active window area 510 as illustrated in FIG. 5B. The page 500 is dragged upward to display a lower segment of the page as illustrated in FIG. 5E. In FIG. 5C, the panning tool 520 is further dragged out of the active window area 510 and into the portion of the autoscroll area 530 on top or above the active window area 510. The corresponding visible image in the active window area 510 is illustrated in FIG. 5C which corresponds to the segment illustrated in FIG. 5E.

In FIG. 5D, the panning tool 520 is active while in the autoscroll area 530 as in FIG. 5C. Because the panning tool 520 is active in the autoscroll area 530, the page 500 continues to scroll in the designated direction in the active window area 510. In this example, the page 500 continues to scroll upward to reveal the lowest portion of the page. This portion of the page that is visible is illustrated in FIG. 5D and corresponds to the portion of the page indicated in FIG. 5E.

FIGS. 5A-5E illustrate the autoscroll area 530 on top of or above the active window area 510 but the autoscroll area 530 on any side of the active window area 510 may be used. Moreover, the direction of scrolling of the page 500 may be based on which area of the autoscroll area 530 is used. For example, if the panning tool 520 is dragged into the autoscroll area 530 to the left of the active window area 510, then the page 500 may continue to scroll toward the right. Alternatively, dragging the panning tool 520 into the autoscroll area 530 on the left may cause the page 500 to continue scrolling to the left depending on user preference. Likewise, dragging the panning tool 520 into the autoscroll area 530 to the right of the active window area 510 may cause the page 500 to continue scrolling toward the left (or right depending on user preference). Whichever scroll direction is chosen for any location of placement of the panning tool 520 in the autoscroll area 530, it is preferable that the scroll direction be standardized so that the user knows which direction of scrolling to expect. In another embodiment, the user may have control in setting the desired direction of scroll for each segment of the autoscroll area 530.

In another example, the autoscroll speed may be controlled by the distance between the nearest edge of the active window area 510 and the panning tool 520 that is within the autoscroll area 530. For example, if the panning tool 520 is dragged into a wide autoscroll area 530 but is held in a position very close to the nearest edge of the active window area 510, then the speed of scrolling may be slow. Conversely, if the panning tool 520 is dragged into a wide autoscroll area 530 and is held in a position farther away from the nearest edge of the active window area 510, then the speed of scrolling may be relatively faster.

In another example pertaining to the speed of scrolling while the panning tool behavior is active in the autoscroll area, the speed of scroll may also vary based on the speed, force, distance or acceleration in which the panning tool was dragged into the autoscroll area. This may provide a more natural, ergonomic feel to the scrolling movement of the page to the user.

After the panning tool is dragged into the autoscroll area and the page continues scrolling as described, the panning tool may be dragged back into the active window area. If the panning tool is dragged back into the active window area while the page is autoscrolling, scrolling of the page may revert back to panning tool control. For example, the page may be scrolling in the desired direction while the panning tool is in the autoscroll area. When the panning tool is then dragged back into the active window area, autoscrolling stops. At that point, scrolling is accomplished by dragging the panning tool in the active window area.

Figure 6A:
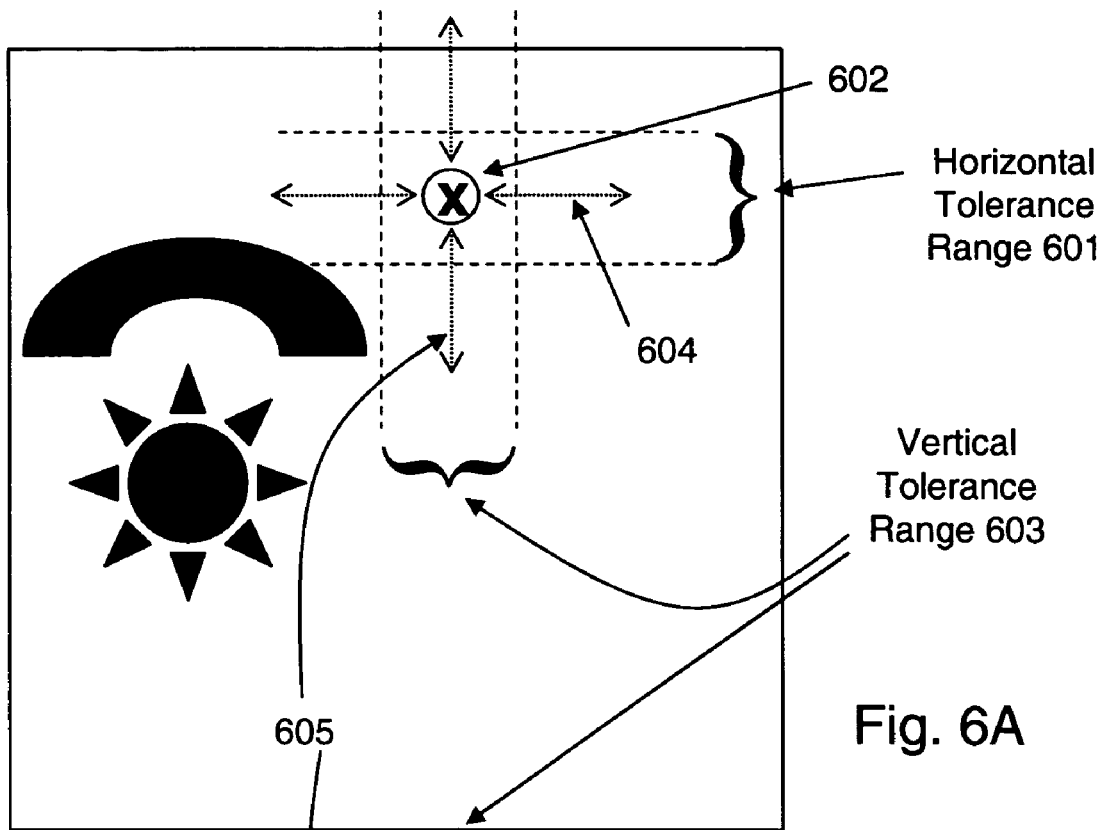
FIGS. 6A and 6B illustrate another example of the panning tool in which a horizontal (or vertical) tolerance range is applied to the scrolling of the displayed information in accordance with aspects of the present invention.
Figure 6B:
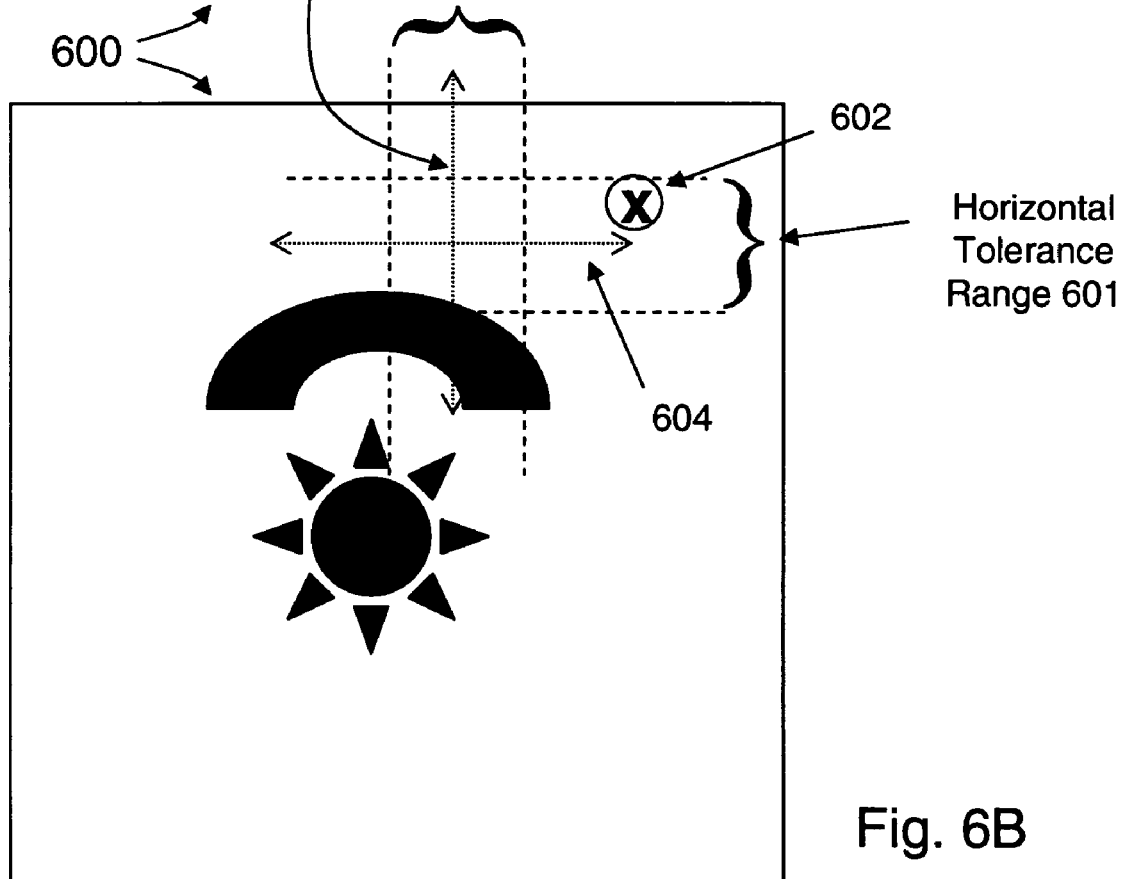

Also, the autoscroll feature may be used in conjunction with the inertial state feature of the present invention. If panning behavior is discontinued, for example, by deactivating an input device such as by lifting a stylus pen from a surface, the information/page will continue to scroll for a predetermined period of time (inertia state of the page). In this example, if the user wishes to halt the scrolling of the page after panning mode is discontinued following autoscroll while the page scrolls in the inertial state, the input device may be activated in the active visible area of the page (e.g., the pen is place down or the mouse button is clicked) to stop movement of the page FIGS. 6A and 6B illustrate another example of an aspect of the invention in which a horizontal tolerance range 601 is applied to the scrolling of displayed information, for example, a page 600. In this example, the page 600 is scrolled in a horizontal direction in tandem with the movement of a cursor or panning tool 602, which is also dragged in a horizontal direction. However, in this example, the cursor or panning tool 602 is not moved in a precisely horizontal direction. Rather, the cursor or panning tool 602 is moved in a horizontal direction that is slightly skewed from the precise horizontal (i.e., 0° or 180°) direction 604. However, the cursor or panning tool 602 remains within a horizontal tolerance range 601 of the precise horizontal direction 604 from the position of the cursor or panning tool 602.

FIG. 6A demonstrates the initial position of the cursor or panning tool 602 on the page 600. The cursor or panning tool 602 is moved in a horizontal direction toward the right. The movement is intended to be in a precise horizontal direction 604 such that the page 600 is scrolled in a horizontal direction without a vertical skew. FIG. 6B illustrates the result of scrolling the page horizontally in tandem with dragging the cursor or panning tool 602 in a horizontal direction with a vertical skew. As illustrated in FIG. 6B, the cursor or panning tool 602 does not follow the path of the precise horizontal direction 604. Rather, the cursor or panning tool 602 is skewed upward. However, the cursor of panning tool 602 remains within a horizontal tolerance range 601 of the precise horizontal direction 604. Thus, the page 600 is scrolled in the precise horizontal direction without a vertical skew even though the cursor or panning tool 602 is moved horizontally with a vertical skew.

The example illustrated in FIGS. 6A and 6B demonstrates precise horizontal biasing of the scrolling of a page 600. In this way, the page 600 is scrolled in a precise horizontal direction 604 even though the cursor or panning tool 602 movement direction deviates from the precise horizontal direction as long as the cursor or panning tool 602 remains within a predetermined horizontal tolerance range 601. The predetermined horizontal tolerance range 601 may be variable or may be constant depending on the needs of the user.

The biasing of page movement as illustrated in FIGS. 6A and 6B may also be applied in different directions. For example, scrolling of the page in a vertical direction may likewise be biased in the vertical direction if horizontal skew of the cursor of panning tool 602 is within a vertical tolerance range 603. Moreover, any direction of movement of interest may exhibit this feature depending on the needs of the user.

It is understood that aspects of the present invention can take many forms and embodiments. The embodiments shown herein are intended to illustrate rather than to limit the invention, it being appreciated that variations may be made without departing from the spirit of the scope of the invention. Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

We claim:

1. A method of providing a display control mechanism for information in a handheld computer or tablet PC, comprising:
    displaying information of a webpage in a display area on a display in said data processing system, the displayed information comprising at least one interactive element and non-interactive element of said webpage;
    displaying a cursor on said display, said cursor capable of being activated by an input device;
    detecting activation of said cursor;
    determining an activation position of said cursor, said activation position being the position of said cursor on said display at which said detected activation occurred, said activation position being determined in relation to the at least one interactive element and non-interactive element;
    detecting movement of said cursor after being activated; and
    in response to detecting said activation and movement, determining whether the display area on the display is to be scrolled by performing the following:
        determining whether the portion of said webpage at the activation position contains an interactive element or non-interactive element of said webpage,
        if the portion of said webpage is determined to contain a non-interactive element of said webpage, scrolling the displayed information in tandem with said movement of said cursor in the display area, and
        if the portion of said webpage is determined to contain an interactive element of said webpage, making a further determination as to whether to activate the contained interactive element or perform scrolling of the display area based on a defined behavior for the contained interactive element.

2. The method of claim, wherein
    for the interactive elements in the group consisting of a button, checkbox, radio, and an ONCLICK Javascript handler, the behaviors are defined to cause scrolling of the displayed information to be performed according to the further determination.

3. The method of claim 1, wherein
    for the interactive elements in the group consisting of an editing handle, a hyperlink, a text box, a password box, an applet, an object, an ONDRAOSTART Javascript handler, Javascript/DHTML, ActiveX, JAVA applets, and an ONMOUSEDOWN Javascript handler, the behaviors are defined to prevent scrolling of the displayed information to be performed according to the further determination.

4. The method of claim 1 wherein the direction of the scrolling of the displayed information is within a tolerance range of the direction of the moving of the cursor.

5. The method of claim 4 wherein the tolerance range is 20 pixels.

6. The method of claim 4 wherein the direction of scrolling of the displayed information is horizontal or vertical.

7. A system for providing a display control mechanism for information in a data processing system, comprising:
    a display for displaying information in a display area and displaying a cursor, the displayed information comprising at least one interactive element and non-interactive element, said cursor capable of being activated by an input device;
    a processor for:
        detecting activation of said cursor;
        determining an activation position of said cursor, said activation position being the position of said cursor on said display at which said detected activation occurred, said activation position being determined in relation to the at least one interactive element and non- interactive element;
        in response to detecting said activation and movement, determining whether the display area on the display is to be scrolled based on a determination of whether the portion of the displayed information at the activation position contains an interactive element or non-interactive element,
    wherein the displayed information is scrolled in the display in tandem with moving said cursor in the display area if an element underlying said cursor when activated in the display area is determined to be a non-interactive element, and
    wherein if an element underlying said cursor when activated in the display area is determined to be an interactive element, a further determination is made as to whether to perform scrolling of the display area based on the underlying interactive element.

8. The system of claim 7, wherein
    the further determination is made based on a defined behavior for the underlying interactive element, and
    for the interactive elements in the group consisting of a button, checkbox, radio, and an ONCLICK Javascript handler, the behaviors are defined to cause scrolling of the display information to be performed according to the further determination.

9. The system of claim 7, wherein
    the further determination is made based on a defined behavior for the underlying interactive element, and
    for the interactive elements in the group consisting of an editing handle, a hyperlink, a text box, a password box, an applet, an object, an ONDRAGSTART Javascript handler, Javascript/DHTML, ActiveX, JAVA applets, and an ONMOUSEDOWN Javascript handler, the behaviors are defined to prevent scrolling of the displayed information to be performed according to the further determination.

10. The system of claim 7 wherein the information is a web page.

11. The system of claim 7 wherein the direction of the scrolling of the displayed information is within a tolerance range of the direction of the moving of the cursor.

12. The system of claim 11 wherein the tolerance range is 20 pixels.

13. The system of claim 11 wherein the direction of scrolling of the displayed information is horizontal or vertical.

14. A computer-readable storage medium comprising executable code for causing a handheld computer or tablet PC to perform the steps of:
    displaying information of a webpage in a display area on a display, the displayed information comprising at least one interactive element and non-interactive element of said webpage;

displaying a cursor on said display, said cursor capable of being activated by an input device;

detecting activation of said cursor and detecting the activation position of said cursor, the activation position being the position on the display at which said cursor was activated, said activation position being determined in relation to the at least one interactive element and non-interactive element;

determining an activation position of said cursor, said activation position being the position of said cursor on said display in relation to the at least one interactive element and non-interactive element;

detecting movement of said cursor after being activated; and in response to detecting said activation and movement, determining whether the display area on the display is to be scrolled by performing the following:

determining whether the portion of said webpage at the activation position contains an interactive element or non-interactive element of said webpage, if the portion of said webpage is determined to contain a non-interactive element of said webpage, scrolling the displayed information in tandem with said movement of said cursor in the display area, and if the portion of said webpage is determined to contain an interactive element of said webpage, making a further determination as to whether to activate the contained interactive element or perform scrolling of the display area based on a defined behavior for the contained interactive element.

15. The computer-readable storage medium of claim 14, wherein for the interactive elements in the group consisting of a button, checkbox, radio, and an ONCLICK Javascript handler, the behaviors are defined to cause scrolling of the displayed information to be performed according to the further determination.

16. The computer-readable storage medium of claim 14, wherein for the interactive elements in the group consisting of an editing handle, a hyperlink, a text box, a password box, an applet, an object, an ONDRAGSTART Javascript handler, Javascript/DHTML, ActiveX, JAVA applets, and an ONMOUSEDOWN Javascript handler.

17. The computer readable storage medium of claim 14 wherein the direction of the scrolling of the displayed information is within a tolerance range of the direction of the moving of the cursor.

18. The computer readable storage medium of claim 17 wherein the tolerance range is 20 pixels.

19. The computer readable storage medium of claim 17 wherein the direction of scrolling of the displayed information is horizontal or vertical.

20. The method of claim 1, wherein an element of the webpage is classified as either an interactive or non-interactive element based on an HTML tag associated with the element.

21. The method of claim 1, wherein for an interactive element with an element style set to cursor and an attribute set to hand, the defined behavior causes scrolling of the displayed information to be performed according to the further determination.

22. The system of claim 7, wherein an element of the displayed information is classified as either an interactive or non-interactive element based on an HTML tag associated with the element.

23. The system of claim 7, wherein the data processing system is a handheld computer or tablet PC.

24. The system of claim 7, wherein the further determination is made based on a defined behavior for the underlying interactive element, and for an interactive element with an element style set to cursor and an attribute set to hand, the defined behavior causes scrolling of the displayed information to be performed according to the further determination.

25. The computer readable storage medium of claim 14, wherein an element of the webpage is classified as either an interactive or non-interactive element based on an HTML tag associated with the element.

26. The computer readable storage medium of claim 14, wherein for an interactive element with an element style set to cursor and an attribute set to hand, the defined behavior causes scrolling of the displayed information to be performed according to the further determination.

* * * * *

UNITED STATES PATENT AND TRADEMARK OFFICE
CERTIFICATE OF CORRECTION

| | | |
|---|---|---|
| PATENT NO. | : 7,434,173 B2 | Page 1 of 1 |
| APPLICATION NO. | : 10/928747 | |
| DATED | : October 7, 2008 | |
| INVENTOR(S) | : Robert J. Jarrett et al. | |

It is certified that error appears in the above-identified patent and that said Letters Patent is hereby corrected as shown below:

In column 15, line 49, in Claim 2, delete "claim," and insert -- claim 1, --, therefor.

In column 15, line 58, in Claim 3, delete "ONDRAOSTART" and insert -- ONDRAGSTART --, therefor.

Signed and Sealed this
Twenty-sixth Day of April, 2011

David J. Kappos
*Director of the United States Patent and Trademark Office*